US012651341B2

(12) United States Patent
Lu et al.

(10) Patent No.: US 12,651,341 B2
(45) Date of Patent: Jun. 9, 2026

(54) ENDOSCOPIC SYSTEM AND METHOD OF ESTIMATING DISTANCE IN ENDOSCOPIC IMAGE

(71) Applicants: TAIPEI MEDICAL UNIVERSITY, Taipei City (TW); National Taipei University of Technology, Taipei City (TW)

(72) Inventors: Po-Wen Lu, Taipei City (TW); Xiu-Zhi Chen, Taipei City (TW); Yen-Lin Chen, Taipei City (TW)

(73) Assignees: TAIPEI MEDICAL UNIVERSITY, Taipei City (TW); NATIONAL TAIPEI UNIVERSITY OF TECHNOLOGY, Taipei City (TW)

( * ) Notice: Subject to any disclaimer, the term of this patent is extended or adjusted under 35 U.S.C. 154(b) by 271 days.

(21) Appl. No.: 18/667,913

(22) Filed: May 17, 2024

(65) Prior Publication Data

US 2025/0037273 A1      Jan. 30, 2025

(30) Foreign Application Priority Data

Jul. 27, 2023    (TW) ................................. 112128211

(51) Int. Cl.
*G06T 7/00*            (2017.01)
(52) U.S. Cl.
CPC .. *G06T 7/0012* (2013.01); *G06T 2207/10068* (2013.01); *G06T 2207/30096* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 9,451,904 | B2 * | 9/2016 | Hensley | A61B 5/1076 |
| 10,580,157 | B2 * | 3/2020 | Wang | A61B 1/2736 |
| 10,736,559 | B2 * | 8/2020 | Wang | A61B 1/000094 |
| 10,742,958 | B2 * | 8/2020 | Yamamoto | A61B 1/00 |
| 10,806,336 | B2 * | 10/2020 | Kaku | A61B 5/1076 |
| 11,234,580 | B2 * | 2/2022 | Igarashi | A61B 1/07 |
| 11,849,914 | B2 * | 12/2023 | Fu | G06N 3/0464 |
| 12,471,804 | B2 * | 11/2025 | Yoshioka | A61B 1/00096 |
| 2010/0092054 | A1 * | 4/2010 | Hensley | A61B 5/704 |
| | | | | 382/128 |
| 2019/0304121 | A1 * | 10/2019 | Wang | G06T 7/85 |
| 2023/0401709 | A1 * | 12/2023 | Sasuga | G06T 19/00 |
| 2023/0419517 | A1 * | 12/2023 | Nakamura | G06T 7/62 |

* cited by examiner

*Primary Examiner* — Anand P Bhatnagar
(74) *Attorney, Agent, or Firm* — HSML P.C.

(57)              ABSTRACT

A method of estimating a distance in an endoscopic image is implemented by an endoscopic system. The method includes steps of: irradiating a lesion of a subject and obtaining an image of the lesion and a scale of the endoscopic system as a to-be-analyzed image while the lesion is being irradiated and the scale is placed adjacent to the lesion; using a lesion-contour prediction model to generate a prediction result that indicates a contour of the lesion; displaying the prediction result; generating two selected points on the contour of the lesion; and estimating, based on the scale in the to-be-analyzed image, an actual distance between the two selected points.

16 Claims, 2 Drawing Sheets

ENDOSCOPIC SYSTEM AND METHOD OF ESTIMATING DISTANCE IN ENDOSCOPIC IMAGE

CROSS-REFERENCE TO RELATED APPLICATION

This application claims priority to Taiwanese Invention patent application No. 112128211, filed on Jul. 27, 2023, and incorporated by reference herein in its entirety.

FIELD

The disclosure relates to an endoscopic system and a method of estimating a distance in an endoscopic image.

BACKGROUND

An endoscope is utilized to look into the interior of a human body for examining lesions (e.g., wounds, ulcers, abscesses, sores, cysts, and tumors). Conventionally, a medical professional may estimate a distance in an endoscopic image based on his/her observation and professional experience and expertise.

SUMMARY

Therefore, an object of the disclosure is to provide an endoscopic system and a method of estimating a distance in an endoscopic image that can alleviate at least one of the drawbacks of the prior art.

According to one aspect of the disclosure, the endoscopic system includes an endoscopic device and a computer device.

The endoscopic device includes an image capturing module, a lighting module, an input module, a processing module that is electrically connected to the image capturing module, the lighting module and the input module, and a scale that has a plurality of patterns each having a predetermined length.

The computer device is electrically connected to the endoscopic device, and includes an output unit, an input unit, and a processing unit that is electrically connected to the output unit and the input unit.

For a subject, the processing module of the endoscopic device is configured to control, based on user operation on the input module of the endoscopic device, the lighting module to irradiate a lesion of the subject and to control the image capturing module to obtain an image of the lesion of the subject and the scale as a to-be-analyzed image while the lesion of the subject is being irradiated by the lighting module and the scale is placed adjacent to the lesion.

The processing unit of the computer device is configured to use a lesion-contour prediction model based on the to-be-analyzed image to generate a prediction result that indicates a contour of the lesion of the subject in the to-be-analyzed image, to display the prediction result via the output unit of the computer device, to generate, based on user operation on the input unit of the computer device, two selected points on the contour of the lesion of the subject indicated by the prediction result, and to estimate, based on the scale in the to-be-analyzed image, an actual distance between the two selected points.

According to another aspect of the disclosure, the method is to be implemented by the endoscopic system that is previously described. The method includes steps of:

for a subject, by the processing module of the endoscopic device based on user operation on the input module of the endoscopic device, controlling the lighting module to irradiate a lesion of the subject and controlling the image capturing module to obtain an image of the lesion of the subject and the scale as a to-be-analyzed image while the lesion of the subject is being irradiated by the lighting module and the scale is placed adjacent to the lesion;

using, by the processing unit of the computer device based on the to-be-analyzed image, a lesion-contour prediction model to generate a prediction result that indicates a contour of the lesion of the subject in the to-be-analyzed image;

displaying, by the processing unit of the computer device, the prediction results via the output unit of the computer device;

generating, by the processing unit of the computer device based on user operation on the input unit of the computer device, two selected points on the contour of the lesion of the subject indicated by the prediction result; and estimating, by the processing unit of the computer device based on the scale in the to-be-analyzed image, an actual distance between the two selected points.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
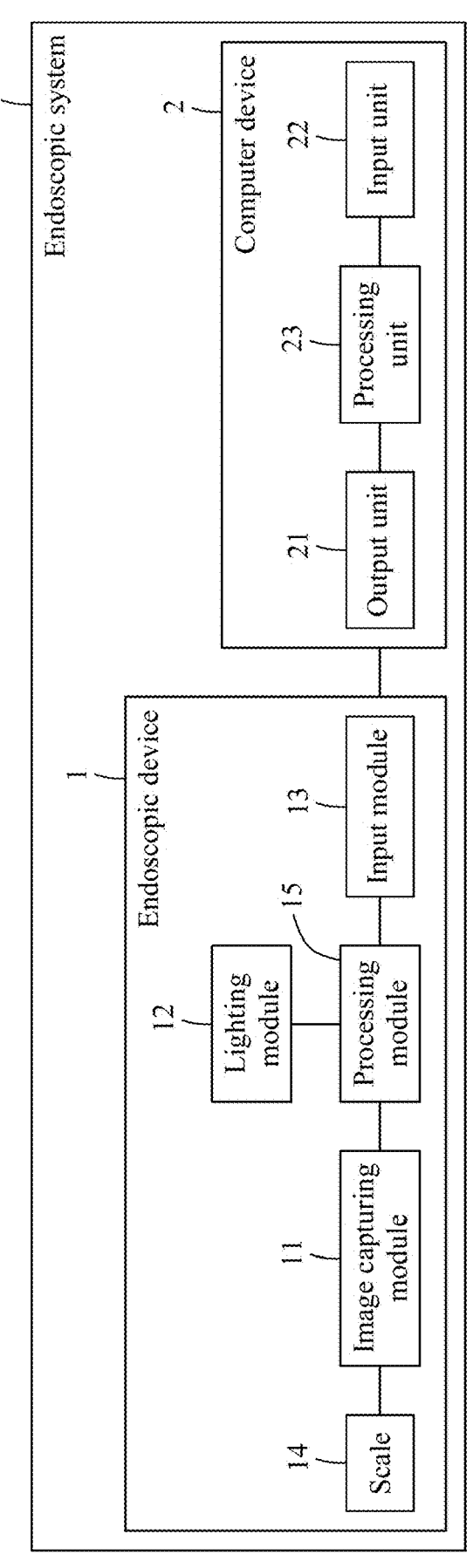
FIG. 1 is a block diagram illustrating an endoscopic system according to an embodiment of the disclosure.

Before the disclosure is described in greater detail, it should be noted that were considered appropriate, reference numerals or terminal portions of reference numerals have been repeated among the figures to indicate corresponding or analogous elements, which may optionally have similar characteristics.

Referring to FIG. 1, an embodiment of an endoscopic system 100 according to the disclosure is illustrated. The endoscopic system 100 includes an endoscopic device 1 and a computer device 2.

The endoscopic device 1 includes an image capturing module 11, a lighting module 12, an input module 13, a scale 14, and a processing module 15 that is electrically connected to the image capturing module 11, the lighting module 12, and the input module 13.

The image capturing module 11 is exemplarily implemented by an endoscope camera, an endoscopy video recorder or the like, but is not limited thereto.

The lighting module 12 is exemplarily implemented by a bulb, a light-emitting diode (LED) or the like but is not limited thereto. The lighting module 12 is capable of emitting light with various wavelengths. Particularly, in this embodiment, the lighting module 12 is capable of emitting white light, purple light (with a wavelength of 410 nm), blue light (with a wavelength of 415 nm), and green light (with a wavelength of 540 nm).

The input module 13 is exemplarily implemented by a pad controller that includes a plurality of buttons but is not limited thereto.

The scale 14 is physically and separably connected to the image capturing module 11, and is conveniently placed at an appropriate location so that the image capturing module 11 may capture an image of the scale 14. The scale 14 has a plurality of patterns each having a predetermined length (e.g., 1 mm).

The processing module 15 may be implemented by a processor, a central processing unit (CPU), a microprocessor, a micro control unit (MCU), a system on a chip (SoC), or any circuit configurable/programmable in a software manner and/or hardware manner to implement functionalities discussed in this disclosure.

The computer device 2 is electrically connected to the endoscopic device 1. The computer device 2 may be implemented to be a desktop computer, a laptop computer, a notebook computer or a tablet computer, but implementation thereof is not limited to what are disclosed herein and may vary in other embodiments. The computer device 2 includes an output unit 21, an input unit 22, and a processing unit 23 that is electrically connected to the output unit 21 and the input unit 22.

The output unit 21 may be a liquid-crystal display (LCD), a light-emitting diode (LED) display, a plasma display panel, a projection display or the like. However, implementation of the output unit 21 is not limited to the disclosure herein and may vary in other embodiments.

The input unit 22 is exemplarily implemented by a mouse, a keyboard or the like, but is not limited thereto.

The processing unit 23 may be implemented by a processor, a CPU, a microprocessor, a MCU, an SoC, or any circuit configurable/programmable in a software manner and/or hardware manner to implement functionalities discussed in this disclosure.

Figure 2:
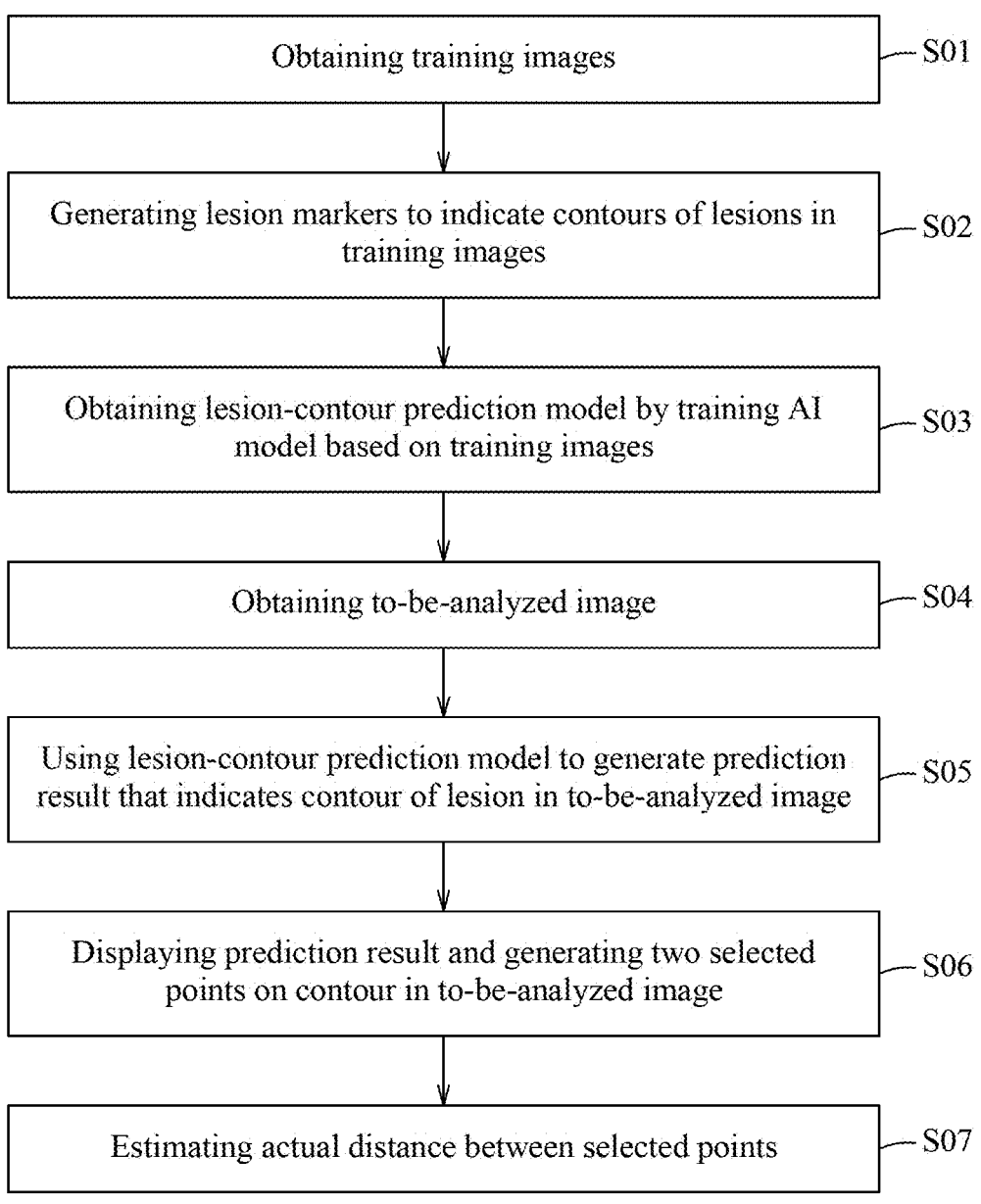
FIG. 2 is a flow chart illustrating a method of estimating a distance in an endoscopic image according to an embodiment of the disclosure.

Referring to FIG. 2, an embodiment of a method of estimating a distance in an endoscopic image according to the disclosure is illustrated. The method is to be implemented by the endoscopic system 100 that is previously described. The method includes steps S01 to S07 as delineated below.

In step S01, for each of a plurality of samples (e.g., patients), based on user operation on the input module 13 of the endoscopic device 1, the processing module 15 of the endoscopic device 1 controls the lighting module 12 to emit light with each of the wavelengths to irradiate a lesion of the sample, and for each of the wavelengths, controls the image capturing module 11 to capture an image of the lesion of the sample respectively as a training image while the lesion of the sample is being irradiated by the light with the wavelength. That is to say, for each of the samples, a number of the training images thus captured is equal to a number of wavelengths of the light to be emitted by the lighting module 12. In one embodiment, for each of the samples and for each of the wavelengths of the light to be emitted by the lighting module 12, multiple training images are captured by the image capturing module 11 for each of various camera angles and for each of various shooting distances. For example, in a scenario where there are ten samples, ten wavelengths of the light to be emitted by the lighting module 12, ten kinds of the camera angles, and ten kinds of the shooting distances, a total number of the training images to be captured by the image capturing module 11 will be ten thousands. It is worth to note that in implementing a technique of narrow band imaging (NBI), an image is captured while a lesion is being irradiated with the blue light and the green light; in implementing a technique of linked color imaging (LCI), an image is captured while a lesion is being irradiated with the purple light.

In step S02, for each of the samples, based on user operation (may be performed by an experienced medical professional) on the input unit 22 of the computer device 2, the processing unit 23 of the computer device 2 generates a lesion marker that indicates a contour of the lesion of the sample in the training image corresponding to the sample.

In step S03, based on the training images respectively of the samples and the lesion markers respectively corresponding to the training images, the processing unit 23 of the computer device 2 trains an artificial intelligence model to obtain a lesion-contour prediction model. In this embodiment, the artificial intelligence model is a semantic segmentation model, but is not limited thereto.

In step S04, for a subject, based on user operation on the input module 13 of the endoscopic device 1, the processing module 15 of the endoscopic device 1 controls the lighting module 12 to emit the light with at least one of the wavelengths (e.g., white light) to irradiate a lesion of the subject, and controls the image capturing module 11 to obtain an image of the lesion of the subject and the scale 14 as a to-be-analyzed image while the lesion of the subject is being irradiated by the lighting module 12 and the scale 14 is placed adjacent to the lesion.

In step S05, based on the to-be-analyzed image, the processing unit 23 of the computer device 2 uses the lesion-contour prediction model to generate a prediction result that indicates a contour of the lesion of the subject in the to-be-analyzed image.

In step S06, the processing unit 23 of the computer device 2 displays the prediction result via the output unit 21 of the computer device 2. In addition, the processing unit 23 of the computer device 2 generates, based on user operation on the input unit 22 of the computer device 2, two selected points on the contour of the lesion of the subject indicated by the prediction result.

In step S07, the processing unit 23 of the computer device 2 estimates an actual distance (i.e., a distance in the real world) between the two selected points based on the scale 14 in the to-be-analyzed image. In particular, the processing unit 23 of the computer device 2 determines a reference distance between the lighting module 12 of the endoscopic device 1 and the lesion of the subject based on the to-be-analyzed image using photometric measurement, determines an estimated distance between the two selected points based on the scale 14 in the to-be-analyzed image, and determines the actual distance between the two selected points based on the reference distance and the estimated distance. It is worth to note that the photometric law of distance is utilized in the photometric measurement. According to the photometric law of distance, illuminance (i.e., the total luminous flux incident on a surface, per unit area) decreases with the square of the distance between a light source and an illuminated surface. That is to say, the longer the distance between the lighting module 12 and the illuminated surface, the less the illuminance. As a result, the distance between the lighting module 12 and the illuminated surface may be determined according to a pre-established look-up table that records corresponding relationships between the illuminances and distances for each of the wavelengths of the light to be emitted by the lighting module 12. Moreover, the lighting module 12 is positioned in proximity to the image capturing module 11, so the distance between the lighting module 12 and the illuminated surface is substantially equal to a distance between the image capturing module 11 and the illuminated surface. Furthermore, a unit distance represented by one of pixels in the to-be-analyzed image is positively correlated to a distance between the image capturing module 11 and the illuminated surface. That is to say, the longer the distance between the image capturing module 11 and the illuminated surface, the longer the unit distance represented by one of the pixels in the to-be-analyzed image; the shorter the distance between the image capturing module 11 and the illuminated surface, the shorter the unit distance represented by one of the pixels in the to-be-analyzed image. Consequently, the unit distance represented by one of the pixels in the to-be-analyzed image may be determined according to another pre-established look-up table that records corresponding relationships between the unit distance represented by one of the pixels in the to-be-analyzed image and the distance between the image capturing module 11 (or the lighting module 12) and the illuminated surface. Based on the aforementioned relationships, the actual distance between the two selected points in the to-be-analyzed image may be estimated based on a number of pixels (each of which represents the unit distance) existed between the two selected points in the to-be-analyzed image and based on the aforementioned pre-established look-up tables.

In one embodiment, the processing unit 23 of the computer device 2 obtains a plurality of the to-be-analyzed images that are related to the lesion of the subject and that are captured with various camera angles and various shooting distances, and a plurality of the prediction results that are respectively related to the to-be-analyzed images. Then, the processing unit 23 of the computer device 2 estimates, based on the prediction results and the to-be-analyzed images, an actual area (i.e., an area in the real world) and an actual volume (i.e., a volume in the real world) of the lesion of the subject. Specifically, based on the previous explanation, the unit distance represented by the pixel in the to-be-analyzed image is positively correlated to the distance between the image capturing module 11 and the illuminated surface, and the processing unit 23 of the computer device 2 is capable of estimating the actual distance between the two selected points in the to-be-analyzed image. Therefore, the actual area may be estimated based on a total number of selected pixels in a closed area related to the lesion of the subject in the to-be-analyzed image. For estimating the actual volume, the image capturing module 11 captures a plurality of multi-viewpoint images from various shooting angles, and then the processing unit 23 of the computer device 2 estimates the actual volume according to a plurality of multi-viewpoint distances that are estimated based on the multi-viewpoint images.

In one embodiment, the processing module 15 of the endoscopic device 1 controls the image capturing module 11 to capture a series of real-time images of the lesion of the subject and the scale 14 while the lesion of the subject is being irradiated by the lighting module 12 and the scale 14 is placed adjacent to the lesion, and selects one of the real-time images as the to-be-analyzed image. The processing unit 23 of the computer device 2 displays the real-time images via the output unit 21 of the computer device 2 so as to allow users to see the real-time images in real time. Furthermore, for each of the real-time images, the processing unit 23 of the computer device 2 determines whether there is a lesion in the real-time image using a lesion identification model, and when it is determined that there is a lesion in the real-time image, marks the lesion (e.g., marks the lesion with a rectangular frame surrounding the lesion) in the real-time image with an indicator that indicates a position of the lesion and a size of the lesion. Since the lesion identification model has been well known to one skilled in the relevant art, detailed explanation of the same is omitted herein for the sake of brevity. For further details, please refer to publications such as "A Survey on Deep Learning for Polyp Segmentation: Techniques, Challenges and Future Trends" authored by Jiaxin Mei et al. in 2023.

It is worth to note that in one embodiment, the endoscopic device 1 and the computer device 2 are integrated as a single device.

To sum up, for the endoscopic system 100 and the method of estimating a distance in an endoscopic image according to the disclosure, the lesion-contour prediction model is obtained by training an artificial intelligence model for generating the prediction result that indicates a contour of a lesion of a subject in an endoscopic image, and then an actual distance between two selected points on the contour of the lesion is estimated based on the scale 14 that is placed adjacent to the lesion in the endoscopic image. It should be noted that an accuracy of estimating the actual distance may be improved by referring to a reference distance, which is determined by using photometric measurement between the lighting module 12 of the endoscopic device 1 and the lesion of the subject. In this way, a medical professional is enabled to have accurate information about an actual size of the lesion of the subject when using endoscopy.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of estimating a distance in an endoscopic image, to be implemented by an endoscopic system that includes an endoscopic device and a computer device, the endoscopic device including an image capturing module, a lighting module, an input module, a scale and a processing module, the scale having a plurality of patterns each having a predetermined length, the computer device including an output unit, an input unit and a processing unit, the method comprising:

for a subject, by the processing module of the endoscopic device based on user operation on the input module of the endoscopic device, controlling the lighting module to irradiate a lesion of the subject and controlling the image capturing module to obtain an image of the lesion of the subject and the scale as a to-be-analyzed image while the lesion of the subject is being irradiated by the lighting module and the scale is placed adjacent to the lesion;

using, by the processing unit of the computer device based on the to-be-analyzed image, a lesion-contour prediction model to generate a prediction result that indicates a contour of the lesion of the subject in the to-be-analyzed image;

displaying, by the processing unit of the computer device, the prediction result via the output unit of the computer device;

generating, by the processing unit of the computer device based on user operation on the input unit of the computer device, two selected points on the contour of the lesion of the subject indicated by the prediction result; and estimating, by the processing unit of the computer device based on the scale in the to-be-analyzed image, an actual distance between the two selected points.

2. The method as claimed in claim 1, further comprising:
for each of a plurality of samples, by the processing module of the endoscopic device based on user operation on the input module of the endoscopic device, controlling the lighting module to irradiate a lesion of the sample and controlling the image capturing module to capture an image of the lesion of the sample as a training image while the lesion of the sample is being irradiated by the lighting module;

for each of the samples, by the processing unit of the computer device based on user operation on the input unit of the computer device, generating a lesion marker that indicates a contour of the lesion of the sample in the training image corresponding to the sample; and by the processing unit of the computer device based on the training images respectively of the samples and the lesion markers respectively corresponding to the training images, training an artificial intelligence model to obtain the lesion-contour prediction model.

3. The method as claimed in claim 2, the lighting module being capable of emitting light with various wavelengths, wherein:
controlling the lighting module to irradiate a lesion of the sample is to control the lighting module to emit light with each of the wavelengths to irradiate the lesion of the sample, and controlling the image capturing module to capture an image of the lesion of the sample as a training image is to, for each of the wavelengths, control the image capturing module to capture an image of the lesion of the sample respectively as a training image while the lesion of the sample is being irradiated by the light with the wavelength; and
controlling the lighting module to irradiate the lesion of the subject is to control the lighting module to emit light with one of the wavelengths to irradiate the lesion of the subject.

4. The method as claimed in claim 3, wherein the lighting module is capable of emitting white light, purple light, blue light, and green light.

5. The method as claimed in claim 1, wherein controlling the image capturing module to obtain an image of the lesion of the subject as a to-be-analyzed image includes:
controlling the image capturing module to capture a series of real-time images of the lesion of the subject and the scale while the lesion of the subject is being irradiated by the lighting module and the scale is placed adjacent to the lesion, and
selecting one of the real-time images as the to-be-analyzed image.

6. The method as claimed in claim 5, further comprising, for each of the real-time images:
determining, by the processing unit of the computer device, whether there is a lesion in the real-time image by using a lesion identification model, and
when it is determined that there is a lesion in the real-time image, marking, by the processing unit of the computer device, the lesion in the real-time image with an indicator that indicates a position of the lesion and a size of the lesion.

7. The method as claimed in claim 1, further comprising:
estimating, by the processing unit of the computer device based on the prediction result and the to-be-analyzed image, an actual area and an actual volume of the lesion of the subject.

8. The method as claimed in claim 1, wherein estimating an actual distance between the two selected points includes:
determining, by the processing unit of the computer device, a reference distance between the lighting module of the endoscopic device and the lesion of the subject based on the to-be-analyzed image using photometric measurement;
determining, by the processing unit of the computer device, an estimated distance between the two selected points based on the scale in the to-be-analyzed image; and
determining, by the processing unit of the computer device, the actual distance between the two selected points based on the reference distance and the estimated distance.

9. An endoscopic system, comprising:
an endoscopic device including an image capturing module, a lighting module, an input module, a processing module that is electrically connected to said image capturing module, said lighting module and said input module, and a scale that has a plurality of patterns each having a predetermined length; and
a computer device electrically connected to said endoscopic device, and including an output unit, an input unit, and a processing unit that is electrically connected to said output unit and said input unit,
wherein for a subject, said processing module of said endoscopic device is configured to control, based on user operation on said input module of said endoscopic device, said lighting module to irradiate a lesion of the subject and to control said image capturing module to obtain an image of the lesion of the subject and said scale as a to-be-analyzed image while the lesion of the subject is being irradiated by said lighting module and said scale is placed adjacent to the lesion;
wherein said processing unit of said computer device is configured to
use a lesion-contour prediction model based on the to-be-analyzed image to generate a prediction result that indicates a contour of the lesion of the subject in the to-be-analyzed image, display the prediction result via said output unit of said computer device, generate, based on user operation on said input unit of said computer device, two selected points on the contour of the lesion of the subject indicated by the prediction result, and estimate, based on said scale in the to-be-analyzed image, an actual distance between the two selected points.

10. The endoscopic system as claimed in claim 9, wherein:

for each of a plurality of samples, said processing module of said endoscopic device is further configured to control, based on user operation on said input module of said endoscopic device, said lighting module to irradiate a lesion of the sample and to control said image capturing module to capture an image of the lesion of the sample as a training image while the lesion of the sample is being irradiated by said lighting module;

for each of the samples, said processing unit of said computer device is further configured to generate, based on user operation on said input unit of said computer device, a lesion marker that indicates a contour of the lesion of the sample in the training image corresponding to the sample; and said processing unit of said computer device is further configured to train, based on the training images respectively of the samples and the lesion markers respectively corresponding to the training images, an artificial intelligence model to obtain the lesion-contour prediction model.

11. The endoscopic system as claimed in claim 10, wherein:

said lighting module is capable of emitting light with various wavelengths;

for each of the samples, said processing module is configured to control said lighting module to emit light with each of the wavelengths to irradiate the lesion of the sample, and for each of the wavelengths, to control said image capturing module to capture an image of the lesion of the sample respectively as a training image while the lesion of the sample is being irradiated by the light with the wavelength;

said processing module is configured to control said lighting module to emit light with one of the wavelengths to irradiate the lesion of the subject.

12. The endoscopic system as claimed in claim 11, wherein said lighting module is capable of emitting white light, purple light, blue light, and green light.

13. The endoscopic system as claimed in claim 9, wherein:

said processing module of said endoscopic device is configured to control said image capturing module to capture a series of real-time images of the lesion of the subject and said scale while the lesion of the subject is being irradiated by said lighting module and said scale is placed adjacent to the lesion, and to select one of the real-time images as the to-be-analyzed image.

14. The endoscopic system as claimed in claim 13, wherein:

for each of the real-time images, said processing unit of said computer device is configured to determine whether there is a lesion in the real-time image by using a lesion identification model, and when it is determined that there is a lesion in the real-time image, mark the lesion in the real-time image with an indicator that indicates a position of the lesion and a size of the lesion.

15. The endoscopic system as claimed in claim 9, wherein said processing unit of said computer device is further configured to estimate, based on the prediction result and the to-be-analyzed image, an actual area and an actual volume of the lesion of the subject.

16. The endoscopic system as claimed in claim 9, wherein said processing unit of said computer device is configured to:

determine a reference distance between said lighting module of said endoscopic device and the lesion of the subject based on the to-be-analyzed image using photometric measurement;

determine an estimated distance between the two selected points based on said scale in the to-be-analyzed image; and determine the actual distance between the two selected points based on the reference distance and the estimated distance.

* * * * *